United States Patent [19]

Kim et al.

[11] Patent Number: 5,563,548
[45] Date of Patent: Oct. 8, 1996

[54] OUTPUT VOLTAGE CONTROLLING CIRCUIT IN A NEGATIVE CHARGE PUMP

[75] Inventors: Joo Y. Kim, Seoul; Joo W. Park, Kyungki-Do, both of Rep. of Korea

[73] Assignee: Hyundai Electronics Industries Co., Ltd., Kyungki-Do, Rep. of Korea

[21] Appl. No.: 519,137

[22] Filed: Aug. 24, 1995

[30]    Foreign Application Priority Data

Aug. 24, 1994 [KR] Rep. of Korea ............... 94-20909

[51] Int. Cl.$^6$ ......................................... H03K 3/01
[52] U.S. Cl. ............................. 327/537; 327/538
[58] Field of Search ............................... 327/534, 535, 327/537, 538, 540, 541, 543, 545, 546

[56]    References Cited

U.S. PATENT DOCUMENTS 5,081,371  1/1992  Wong ........................ 327/537
5,113,088  5/1992  Yamamoto et al. ................ 327/537
5,168,174  12/1992  Naso et al. ..................... 327/540
5,172,018  12/1992  Colandrea et al. ................ 327/537
5,347,171  9/1994  Cordoba et al. .

*Primary Examiner*—Timothy P. Callahan
*Assistant Examiner*—Eunja Shin
*Attorney, Agent, or Firm*—Fish & Richardson P.C.

[57]    ABSTRACT

The present invention relates to an output voltage controlling circuit in the negative charge pump which allows the output voltage of the negative charge pump to be controlled at a desired voltage level using a breakdown point of the PMOS transistor for high voltage by a PMOS transistor for high voltage connected between the output terminal of the negative charge pump and a reference voltage generation circuit.

11 Claims, 3 Drawing Sheets

OUTPUT VOLTAGE CONTROLLING CIRCUIT IN A NEGATIVE CHARGE PUMP

FIELD OF THE INVENTION

The present invention relates to an output voltage controlling circuit in a negative charge pump, and more particularly to an output voltage controlling circuit in the negative charge pump, which allows the output voltage of the negative charge pump to be controlled at a desired level of voltage by a PMOS transistor connected to an output terminal of the negative charge pump.

BACKGROUND OF THE INVENTION

Generally, in the prior art, an additional reference voltage generation circuit is required to control the output voltage of the negative charge pump. The reference voltage generated from the reference voltage generation circuit is compared with the output voltage of the negative charge pump. When the output voltage of the negative charge pump reaches at a desired voltage level, a control signal is generated. The control signal is feedbacked into the reference voltage generation circuit for driving the negative charge pump and so controls the reference voltage generation circuit. As such, the output voltage of the negative charge pump can be controlled.

In the above prior art, an additional reference voltage generation circuit, capacitors, and means for feedbacking a signal therefrom into the reference voltage generation circuit are used to control the output voltage of the negative charge pump, resulting in a complication of the circuit and an increase area of the chip, and these analog circuits cause a characteristic variation to depend on a process and a temperature. As a result, it is difficult to exactly control the output voltage of the negative charge pump. If such an incorrect voltage is used in an analog circuit, there is a problem which could not remove data stored in a memory cell completely.

SUMMARY OF THE INVENTION

According to the present invention, a backward bias is applied to the P-N junction diode by connecting the P-N junction diode of a PMOS transistor for high voltage between the output terminal of a negative charge pump and a reference voltage generation circuit and supplying the output voltage of the negative charge pump to a P-type junction. When a backward bias reaches a junction breakdown voltage, a breakdown occurs and an electrical current causes to flow. As a result, the output voltage of the negative charge pump is no longer pumped and is saturated.

Therefore, the purpose of the present invention is to provide an output voltage controlling circuit in the negative charge pump which causes a breakdown to occur at a desired pumping voltage level by supplying a reference voltage to a N-type junction, thereby overcoming the above problem of the prior art.

An output voltage controlling circuit of a negative charge pump comprises a PMOS transistor having a gate electrode, a source electrode and a drain electrode which are formed on a N-well, with the gate electrode being grounded, the drain electrode being floated and the source electrode being connected to an output terminal of the negative charge pump; a first controlling circuit connected between an input terminal and the output terminal of the negative charge pump, wherein an enable signal is received at an input terminal of the first controlling circuit and the input terminal of the negative charge pump; a bias supplying means connected between the output terminal of the negative charge pump and the N-well to control the output voltage of the negative charge pump, the bias supplying means having a second controlling circuit connected to the output terminal of the negative charge pump, a reference voltage generation circuit generating a reference voltage according to the output signal of the second controlling circuit, and a third controlling circuit connected between the reference voltage generation circuit and the N-well of a voltage controlling circuit, wherein the third controlling circuit is controlled by the output signal of the second controlling circuit.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts through the several views of the drawings.

DETAILED DESCRIPTION OF THE INVENTION

Figure 1:
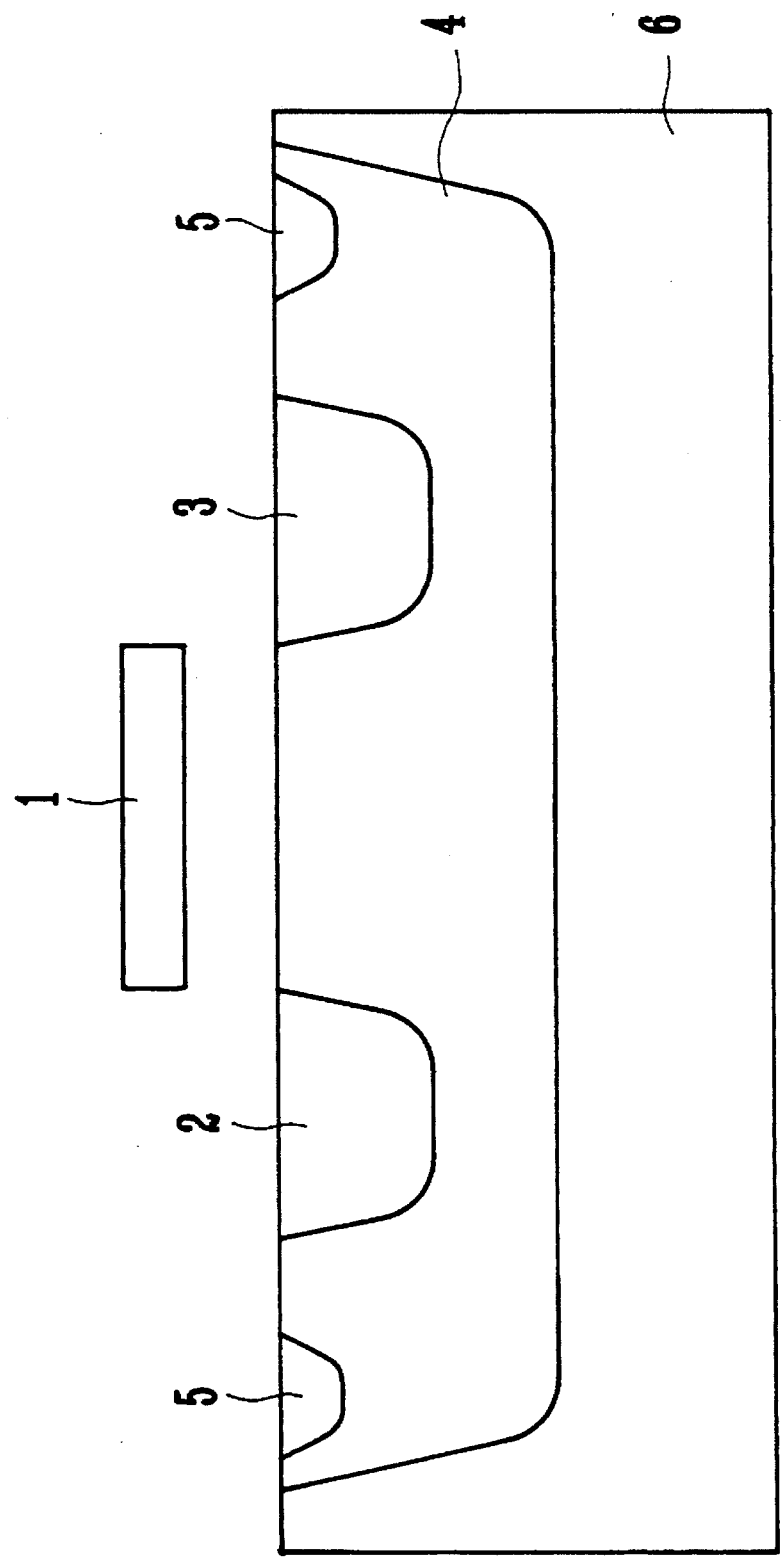
FIG. 1 is a sectional view of the PMOS transistor for high voltage which can be used for the output voltage controlling circuit in the negative charge pump according to the present invention.

The present invention will be described in detail by reference to the accompanying drawings. FIG. 1 is a sectional view of the PMOS transistor for high voltage which can be used for the output voltage controlling circuit in the negative charge pump according to the present invention. In FIG. 1, reference numeral 1 is a gate region, 2 and 3 show a source region and a drain region respectively, 4 is a N-well, 5 is a N$^+$ region for applying a bias for the N-well.

Figure 2:
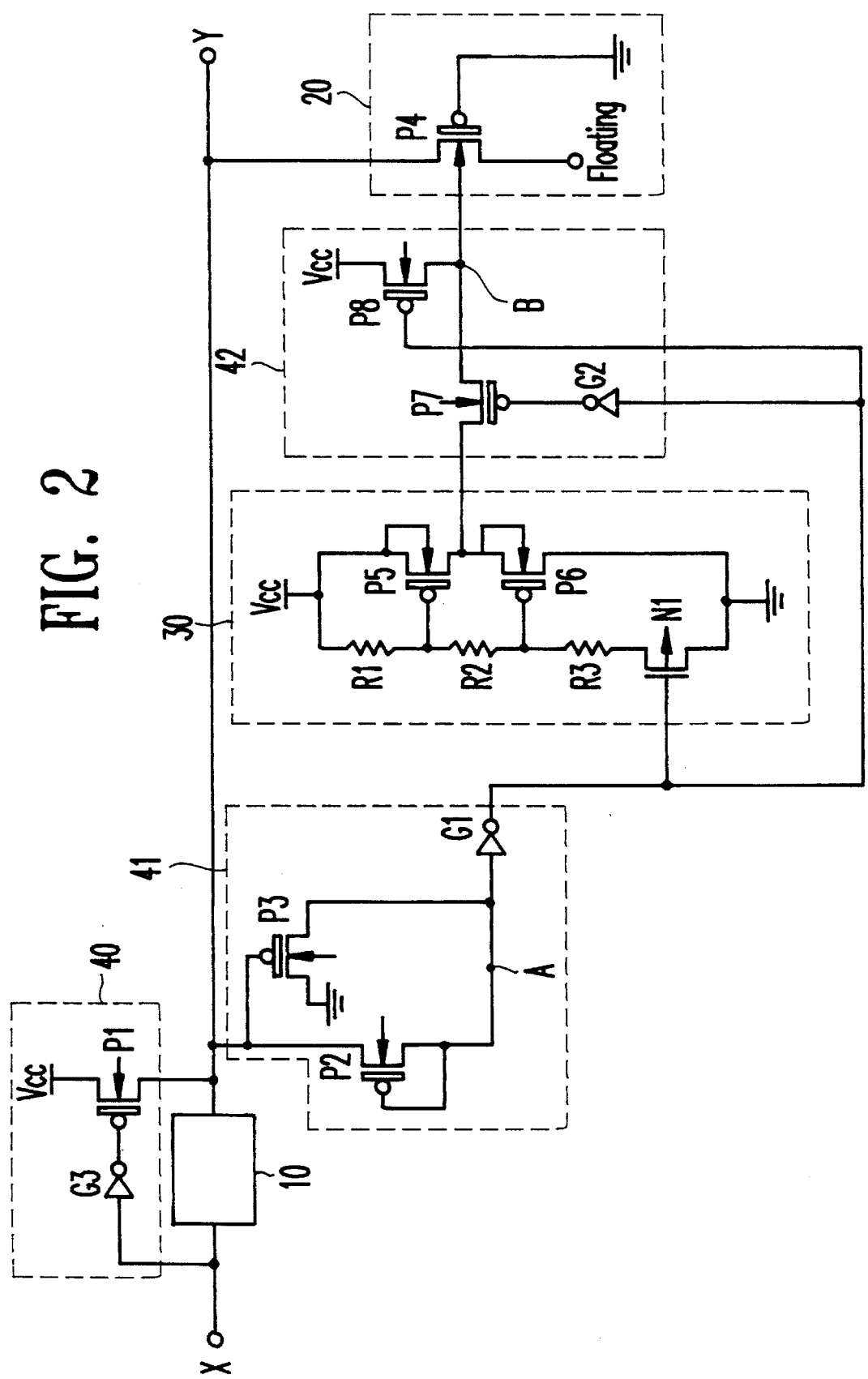
FIG. 2 is a output voltage controlling circuit in the negative charge pump according to the present invention.
Figure 3A:
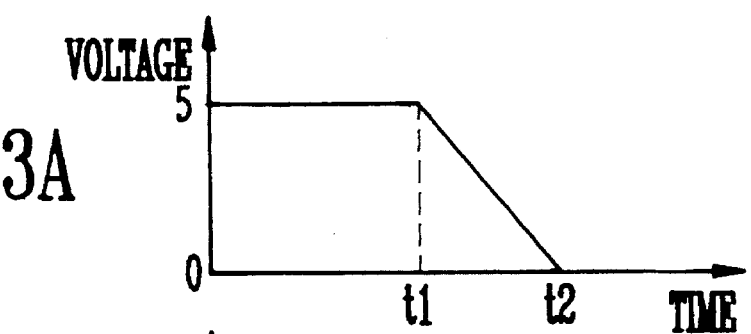
FIG. 3A to FIG. 3D are waveform diagrams of nodes(A, B,C and D) to illustrate operations of FIG. 2.
Figure 3B:
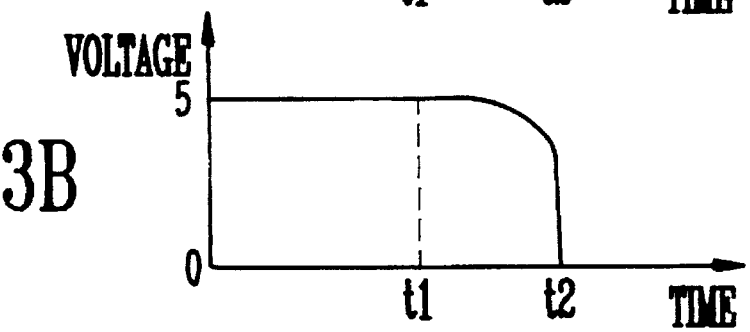
Figure 3C:
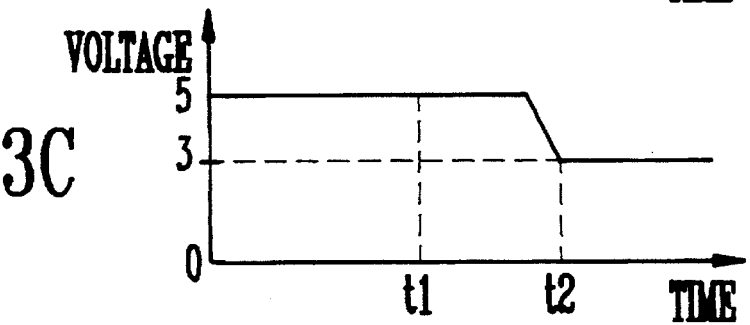
Figure 3D:
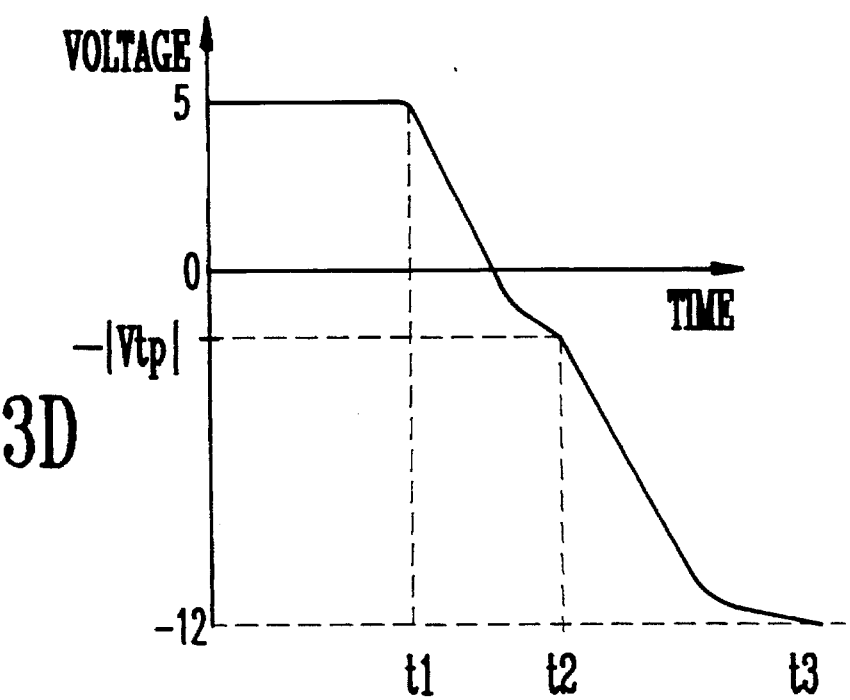

FIG. 2 shows the output voltage controlling circuit in the negative charge pump according to the present invention. FIG. 2 will be described in detail in conjunction with FIG. 3A through FIG. 3D.

When an enable signal X is in a HIGH state (time t1 in FIG. 3A), a negative charge pump 10 to which the enable signal X is inputted is turned off. Also a PMOS transistor P1 in a first controlling circuit 40 to which the enable signal X is inputted through an inverter G3 is turned on. Accordingly, the output of the negative charge pump 10 turns into a HIGH(Vcc) state(time t1 in FIG. 3D).

The HIGH potential output of the negative charge pump 10 is received into a second controlling circuit 41. Also a first PMOS transistor P3 for high voltage in the second controlling circuit 41 is turned off. Then, as the output of the negative charge pump 10 is supplied into the node A through a second PMOS transistor P2 for high voltage of the second controlling circuit 41, the potential of the node A turns into a HIGH state (time t1 in FIG. 3B). However, as the HIGH state of the node A is reversed into a LOW state through the inverter G1, the output of the second controlling circuit 41 becomes a LOW state. The LOW output of the second controlling circuit 41 is received into a reference voltage generation circuit 30 and a third controlling circuit 42 respectively. Then, as a NMOS transistor N1 of a reference voltage generating circuit 30 is turned off, the reference voltage which is controlled by a first, a second and a third resistor R1, R2 and R3 and a first and a second PMOS transistor P5 and P6 of the reference voltage generation circuit 30 is not generated. Also, as the output of the second controlling circuit 41 is received into a second PMOS transistor P7 of the third controlling circuit 42 through an inverter G2, the second PMOS transistor P7 is turned off. Accordingly, the output of the reference voltage generating circuit 30 is blocked off. Also, a first PMOS transistor P8 of the third controlling circuit 42 to which the LOW output of the second controlling circuit 41 is inputted is turned on. Then, as the power supply Vcc is supplied into a node B through the first PMOS transistor P8, the potential of the node B turns into a high voltage Vcc state (time t1 in FIG. 3C). Accordingly, the output of the third controlling circuit 42 turns into a high voltage Vcc state. After that, the HIGH potential output of the third controlling circuit 42 and the HIGH potential output of the negative charge pump 10 are received into a voltage controlling circuit 20. As a result, the HIGH potential output of the third controlling circuit 42 is supplied into the N-well of the PMOS transistor P4 for high voltage and the HIGH potential output of the negative charge pump 10 is supplied into the source electrode of the PMOS transistor P4 for high voltage. Then, as the drain electrode of the PMOS transistor P4 for high voltage is in a floating state and the gate electrode is connected ground, the PMOS transistor P4 for high voltage has a construction of a P-N diode. As a result, the output of the negative charge pump 10 remains in a high voltage Vcc state (time t1 in FIG. 3D).

On the one hand, if the enable signal X changes from a HIGH state to a LOW state (time t2 in FIG. 3A), the PMOS transistor P1 for high voltage in the first controlling circuit 40 to which the enable signal X is inputted is turned off and the negative charge pump 10 is turned on. Accordingly, the output of the negative charge pump 10 changes to a LOW state. Then if the negative charge pump 10 operates and so the potential of the output terminal Y turns into a –|Vtp| (time t2 in FIG. 3D), the potential of the node A turns into a LOW state through the first PMOS transistor P3 for high voltage (time t2 in FIG. 3B). Accordingly, as the LOW state of the node A is reversed into a HIGH state through the inverter G1, the output of the second controlling circuit 41 becomes a HIGH state. The HIGH potential output of the second controlling circuit 41 is received into the reference voltage generation circuit 30 and the third controlling circuit 42 respectively. Then, as the NMOS transistor N1 of the reference voltage generation circuit 30 is turned on, the reference voltage (hence, assume that an controlled reference voltage is 3 V) is generated by the first, the second and the third resistor R1, R2, R3, the NMOS transistor N1 and the first and the second PMOS transistors P5 and P6. The NMOS transistor N1 receives the output signal of the second controlling circuit 41, the first, the second and the third resistor R1, R2, R3 are series connected between a drain electrode of the NMOS transistor N1 and the voltage supply source Vcc. And the first and the second PMOS transistor P5 and P6 are series connected between the voltage supply source Vcc and ground.

Also the output of the second controlling circuit 41 is received into the PMOS transistor P7 via the inverter G2, the second PMOS transistor P7 is turned on. Accordingly, the output of the reference voltage generation circuit 30 is supplied into the third controlling circuit 42. Then the first PMOS transistor P8 to which the HIGH potential output of the second controlling circuit 41 is inputted is turned off. As a result, the potential of the node B turns into the output of the reference voltage generation circuit 30 (time t2 in FIG. 3C). Therefore, the output of the third controlling circuit 42 turns into a HIGH(3 V) state, After that, the HIGH potential output(3 V) of the third controlling circuit 42 and the LOW potential output of the negative charge pump 10 are received into the voltage controlling circuit 20 respectively. That is, the HIGH potential output(3 V) of the third controlling circuit 42 is supplied into the N-well of the PMOS transistor P4 for high voltage. The LOW potential output of the negative charge pump 10 is supplied into the source electrode of the PMOS transistor P4 for high voltage. Then, as the drain electrode of the PMOS transistor P4 for high voltage is in a floating state and the gate electrode is connected to ground, the PMOS transistor P4 for high voltage has a construction of a P-N diode. Accordingly, the output of the negative charge pump 10 remains in a LOW state.

That is, when the negative charge pump 10 does not operate, the N-well of the PMOS transistor P4 for high voltage remains in a high voltage Vcc state, and when the negative charge pump 10 operates, the output voltage from the reference voltage generation circuit 30 is received into the N-well of the PMOS transistor P4 for high voltage, thereby allowing the output voltage of the negative charge pump 10 to be controlled at a desired voltage level.

On the other hand, the junction breakdown voltage at process conditions using a N-well on a P-type substrate is set to a given voltage value as one parameter of the element. For example, if the junction breakdown voltage is set at 15 V and the output voltage of the negative charge pump is applied to the P-type junction so that a backward bias can be applied to the P-N diode, a junction breakdown can occur when the output of the negative charge pump turns into –15 V. As a result, the output voltage of the negative charge pump can be controlled at –15 V. However, if +3 V is applied to the N-type junction using the reference voltage generation circuit, the negative pumping voltage can be controlled at –12 V (time t2 in FIG. 3D). As such, the method of the present invention can control the output voltage of the negative charge pump at a desired voltage level.

As mentioned above, the present invention allows the output voltage of the negative charge pump to be controlled at a desired voltage level by the PMOS transistor connected to the output terminal of the negative charge pump, thereby simplifying circuit of the chip and reducing greatly the size of the chip. Also the variation of controlled voltage, which is depended on a temperature can be reduced to minimum level, thereby increasing a reliability of the chip.

Although this invention has been described in its preferred form wilt a certain degree of particularity, it is appreciated by those skilled in the art that the present disclosure of the preferred form has been made only as an example and that numerous changes in the detailed of the construction, combination and arrangement of its part may be resorted to without departing from the spirit and scope of the invention.

What is claimed is:

1. An output voltage controlling circuit of a negative charge pump comprising:

a first controlling circuit connected between an input terminal and an output terminal of said negative charge pump, wherein an enable signal is received at an input terminal of said first controlling circuit and the input terminal of said negative charge pump, said first controlling circuit including:

(a) a PMOS transistor connected between a voltage supply source Vcc and said output terminal of said negative charge pump, and having gate electrode, a source electrode and a drain electrode and (b) an inverter connected between said gate electrode of said PMOS transistor and said input terminal of said negative charge pump;

a second controlling circuit connected to said output terminal of said negative charge pump;

a reference voltage generation circuit generating a reference voltage according to an output signal of said second controlling circuit;

a third controlling circuit connected to said reference voltage generation circuit, and for receiving said output signal of said second controlling circuit; and a voltage controlling circuit connected to said output terminal of said negative charge pump, and for receiving an output signal of said third controlling circuit.

2. An output voltage controlling circuit of a negative charge pump comprising:

a first controlling circuit connected between an input terminal and an output terminal of said negative charge pump, wherein an enable signal is received at an input terminal of said first controlling circuit and the input terminal of said negative charge pump;

a second controlling circuit connected to said output terminal of said negative charge pump, said second controlling circuit including:

(a) a first PMOS transistor connected between a node A and a ground voltage Vss, and said first PMOS transistor receiving output signal of said negative charge pump, (b) a second PMOS transistor connected between said output terminal of said negative charge pump and said node A and (c) an inverter connected to node A;

a reference voltage generation circuit generating a reference voltage according to an output signal of said second controlling circuit;

a third controlling circuit connected to said reference voltage generation circuit, and for receiving said output signal of said second controlling circuit, wherein an output signal of said inverter is inputted to said reference voltage generation circuit and said third controlling circuit; and a voltage controlling circuit connected to said output terminal of said negative charge pump, and for receiving an output signal of said third controlling circuit.

3. An output voltage controlling circuit of a negative charge pump comprising:

a first controlling circuit connected between an input terminal and an output terminal of said negative charge pump, wherein an enable signal is received at an input terminal of said first controlling circuit and the input terminal of said negative charge pump;

a second controlling circuit connected to said output terminal of said negative charge pump;

a reference voltage generation circuit generating a reference voltage according to an output signal of said second controlling circuit, said reference voltage generation circuit including:

(a) a NMOS transistor for receiving said output signal of said second controlling circuit, (b) a plurality of reference resistors connected in series between a drain electrode of said NMOS transistor and a voltage supply source Vcc and (c) a pair of PMOS transistors connected in series between said voltage supply Vcc and a ground voltage Vss;

a third controlling circuit connected to said reference voltage generation circuit, and for receiving said output signal of said second controlling circuit; and a voltage controlling circuit connected to said output terminal of said negative charge pump, and for receiving an output signal of said third controlling circuit.

4. An output voltage controlling circuit of a negative charge pump comprising:

a first controlling circuit connected between an input terminal and an output terminal of said negative charge pump, wherein an enable signal is received at an input terminal of said first controlling circuit and the input terminal of said negative charge pump;

a second controlling circuit connected to said output terminal of said negative charge pump;

a reference voltage generation circuit generating a reference voltage according to an output signal of said second controlling circuit;

a third controlling circuit connected to said reference voltage generation circuit, and for receiving said output signal of said second controlling circuit, said third controlling circuit including:

(a) an inverter for inverting said output signal of said second controlling circuit, (b) a second PMOS transistor receiving an output signal of said inverter and connected between said reference voltage generation circuit and a node B and (c) a first PMOS transistor connected between a voltage supply source Vcc and said node B, and receiving said output signal of said second controlling circuit;

a voltage controlling circuit connected to said output terminal of said negative charge pump, and for receiving an output signal of said third controlling circuit.

5. An output voltage controlling circuit of a negative charge pump comprising:

a first controlling circuit connected between an input terminal and an output terminal of said negative charge pump, wherein an enable signal is received at an input terminal of said first controlling circuit and the input terminal of said negative charge pump;

a second controlling circuit connected to said output terminal of said negative charge pump;

a reference voltage generation circuit generating a reference voltage according to an output signal of said second controlling circuit;

a third controlling circuit connected to said reference voltage generation circuit, and for receiving said output signal of said second controlling circuit; and a voltage controlling circuit connected to said output terminal of said negative charge pump, and for receiving an output signal of said third controlling circuit, said voltage controlling circuit including:

(a) a PMOS transistor for high voltage having a gate electrode connected to a ground voltage Vss, a source electrode connected to said output terminal of said negative charge pump, a floated drain electrode and a N-well connected to a node B of said third controlling circuit, said source electrode and said N-well are operated as P-N junction diode.

6. An output voltage controlling circuit in a negative charge pump comprising:

a PMOS transistor having a gate electrode, a source electrode and a drain electrode which are formed on a N-well with said gate electrode being grounded, said drain electrode being floated and said source electrode being connected to an output terminal of said negative charge pump;

a first controlling circuit connected between an input terminal of said negative charge pump and said output terminal of said negative charge pump, wherein an enable signal is received at an input terminal of said first controlling circuit and the input terminal of said negative charge pump; and a bias supplying means connected between said output terminal of said negative charge pump and said N-well to control an output voltage of said negative charge pump, said bias supplying means having a second controlling circuit connected to said output terminal of said negative charge pump, a reference voltage generation circuit generating a reference voltage according to an output signal of said second controlling circuit, and a third controlling circuit connected between said reference voltage generation circuit and said N-well of said PMOS transistor, wherein said third controlling circuit is controlled by said output signal of said second controlling circuit.

7. The controlling circuit of claim 6, wherein said first controlling circuit comprises:

a PMOS transistor having a gate electrode, a drain electrode and a source electrode with said source electrode being connected to a voltage supply source and said drain electrode being connected to said output terminal of said negative charge pump; and an inverter connected between said gate electrode of said PMOS transistor and said input terminal of said negative charge pump.

8. The controlling circuit including the second controlling circuit as claimed in claim 6, and further comprising a connecting node, wherein:

a first PMOS transistor connected between ground and said node, with said first PMOS transistor being turned on depending upon said output terminal, of said negative charge pump;

a second PMOS transistor connected between said node and said output terminal of said negative charge pump, wherein a gate electrode of said second PMOS transistor is connected to said node; and an inverter to invert voltage potential of said node, wherein an output signal of said inverter is inputted to said reference voltage generation circuit and said third controlling circuit.

9. The controlling circuit of claim 6, wherein said reference voltage generation circuit comprises:

first and second PMOS transistors connected, in series, between a voltage supply source and ground;

a first resistor connected between said voltage supply source and a gate electrode of said first PMOS transistor;

a second resistor connected between said gate electrode of said first and said second PMOS transistors; and a third resistor and a NMOS transistor connected, in series, between said gate electrode of said second PMOS transistor and said ground, with a gate electrode of said NMOS transistor receiving said output signal of said second controlling circuit.

10. The controlling circuit of claim 6, wherein said third controlling circuit comprises:

a first PMOS transistor connected between said N-well of said PMOS transistor and a voltage supply source;

a second PMOS transistor connected between said N-well of said PMOS transistor and said reference voltage generation circuit; and an inverter connected between said second controlling circuit and a gate electrode of said second PMOS transistor.

11. The controlling circuit of claim 6, wherein said source electrode and said N-well of said PMOS transistor are operated as P-N junction diode.

* * * * *